(12) United States Patent  
Janakiraman et al.

(10) Patent No.: US 9,055,547 B1  
(45) Date of Patent: Jun. 9, 2015

(54) SYSTEMS AND METHODS FOR PROVIDING LOCATION BASED SERVICES

(71) Applicant: Tektronix, Inc., Beaverton, OR (US)

(72) Inventors: Vignesh Janakiraman, Plano, TX (US); Seshu Dommaraju, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 42 days.

(21) Appl. No.: 14/142,311

(22) Filed: Dec. 27, 2013

(51) Int. Cl.
*H04W 24/00* (2009.01)
*H04W 64/00* (2009.01)

(52) U.S. Cl.
CPC ..................................... *H04W 64/00* (2013.01)

(58) Field of Classification Search
USPC ....................................................... 455/456.1
See application file for complete search history.

(56) References Cited

U.S. PATENT DOCUMENTS

2012/0142313 A1* 6/2012 Edge ............................. 455/410

* cited by examiner

*Primary Examiner* — Joel Ajayi
(74) *Attorney, Agent, or Firm* — Locke Lord LLP; Scott D. Wofsy; Christopher J. Capelli (57) ABSTRACT

An subscriber location device for determining location information for User Equipment (UE) in a communication network monitors a network interface between a Mobility Management Entity node and an Evolved Serving Mobile Location Center (E-SMLC) node, receive location information from network interface between the MME node and the E-SMLC node, associates the received location information with corresponding UE to yield associated location information and stores the associated location information in a subscriber location database, indexed according to the UE.

17 Claims, 6 Drawing Sheets

SYSTEMS AND METHODS FOR PROVIDING LOCATION BASED SERVICES

BACKGROUND

1. Field of the Invention

The present disclosure relates generally to communication networks, and more specifically to techniques for improving location services.

2. Description of the Related Art

Long Term Evolution (LTE) networks generally use 4th generation (4G) wireless technologies and are considered a next evolution for GSM (Global System for Mobile Communications). LTE builds on the 3GPP family including GSM, GPRS (General packet radio service), EDGE (Enhanced Data rates for GSM Evolution), etc., and is an all-IP standard. LTE provides higher data transmission rates while efficiently utilizing the spectrum thereby supporting a multitude of subscribers than is possible with pre-4G spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 4G network and the Internet seamlessly.

LTE network also support location services and positioning. Positioning refers to a functionality that determines a geographical location of a target UE. Location services refer to any services based on or related to location information, which may include any information related to the location of a UE, e.g., measurements, a location estimate, etc. Often, it is desirable to find the location of a mobile, wireless or wired device for various reasons such as improved network performance, part of many services, emergency situations, and the like.

With respect to determining location of the UE in LTE networks, conventional LoCation Services (LCS) clients query locations for UE and communicate with, for example, Gateway Mobile Location Center(s) (GMLCs) in order to request the location of the UE. The GMLCs communicate with one or more additional nodes, which communicate with the UE, as necessary, to obtain a location estimate for the UE. The GMLC then returns the location estimate to the LCS client.

Although obtaining location via conventional LCS client requests/responses have generally been considered satisfactory for their intended purpose, there is still a need in the art for improved location services that, for example, maintain one or more subscriber location databases for UE.

SUMMARY

According to one or more embodiments of the invention, a network monitoring system extracts geographical location information associated with User Equipment (UE). The extracted location information is stored in a Subscriber Location Database (SLD), which can subsequently be queried by various network applications that need location based services (e.g., via a SLD Application Programming Interface (API)). The location information is obtained by monitoring a SLs network interface between a Mobility Management Entity (MME) node and an Evolved Serving Mobile Location Centre (E-SMLC) node. Location information includes, but is not limited to geographical coordinates (e.g., altitude, horizontal speed, vertical velocity, etc.). The network monitoring system provides the location of particular UE when, for example, it is queried by applications. Optionally, the networking monitoring system can transmit a LCS client request to a Gateway Mobile Location Center (GMLC) node thereby triggering a location information procedure from the UE, discussed in greater detail below.

According to another embodiment of the invention, a subscriber location node/device determines location information for User Equipment (UE) in a communication network using improved subscriber location techniques. For example, the subscriber location device monitors a network interface between a Mobility Management Entity node and an Evolved Serving Mobile Location Center (E-SMLC) node and receives location information (e.g., altitude, a horizontal speed and a vertical velocity, etc.) from network interface between the MME node and the E-SMLC node (e.g., an SLs network interface, etc.). The subscriber location device further associates the received location information with corresponding UE to yield associated location information, and stores the associated location information in a subscriber location database, indexed according to the UE.

In certain other embodiments, the subscriber location device also receives a request for the associated location information for the UE from an application and retrieves (e.g., in response to the request) the associated location information stored in the subscriber location database. The subscriber location database further provides the associated location information to the application in response to the received request. Additionally, in these embodiments, the subscriber location device determines the associated location information stored in the subscriber location database needs to be updated, using, for example, trigger criteria that includes a geographical position of the UE, a time, and a detected handover of the UE in the communication network, a geographical position of the UE relative to an emergency situation, a geographical position of the UE relative to retail facility, etc. Once determined, the subscriber location device triggers an update for the associated location information stored in the subscriber location database that causes a location services client to send a location services request to a Gateway Mobile Location Centre (GMLC) node. In turn, the GMLC node causes, via the MME node, the UE to send location information across the network interface between the MME node and the E-SMLC node.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

This disclosure provides network monitoring systems and techniques employed in communication networks such as cellular 4G/LTE communication networks. As discussed in greater detail herein, these network monitoring systems and techniques provide, for example, comprehensive location based services including, storing location information for associated User Equipment (UE), querying UE for updated location information, providing event based triggers (e.g., cellular network changes, handovers, time-based events, geofencing, etc.) that update UE location information, maintaining precise historical and current location information for UE, and the like.

Figure 1:
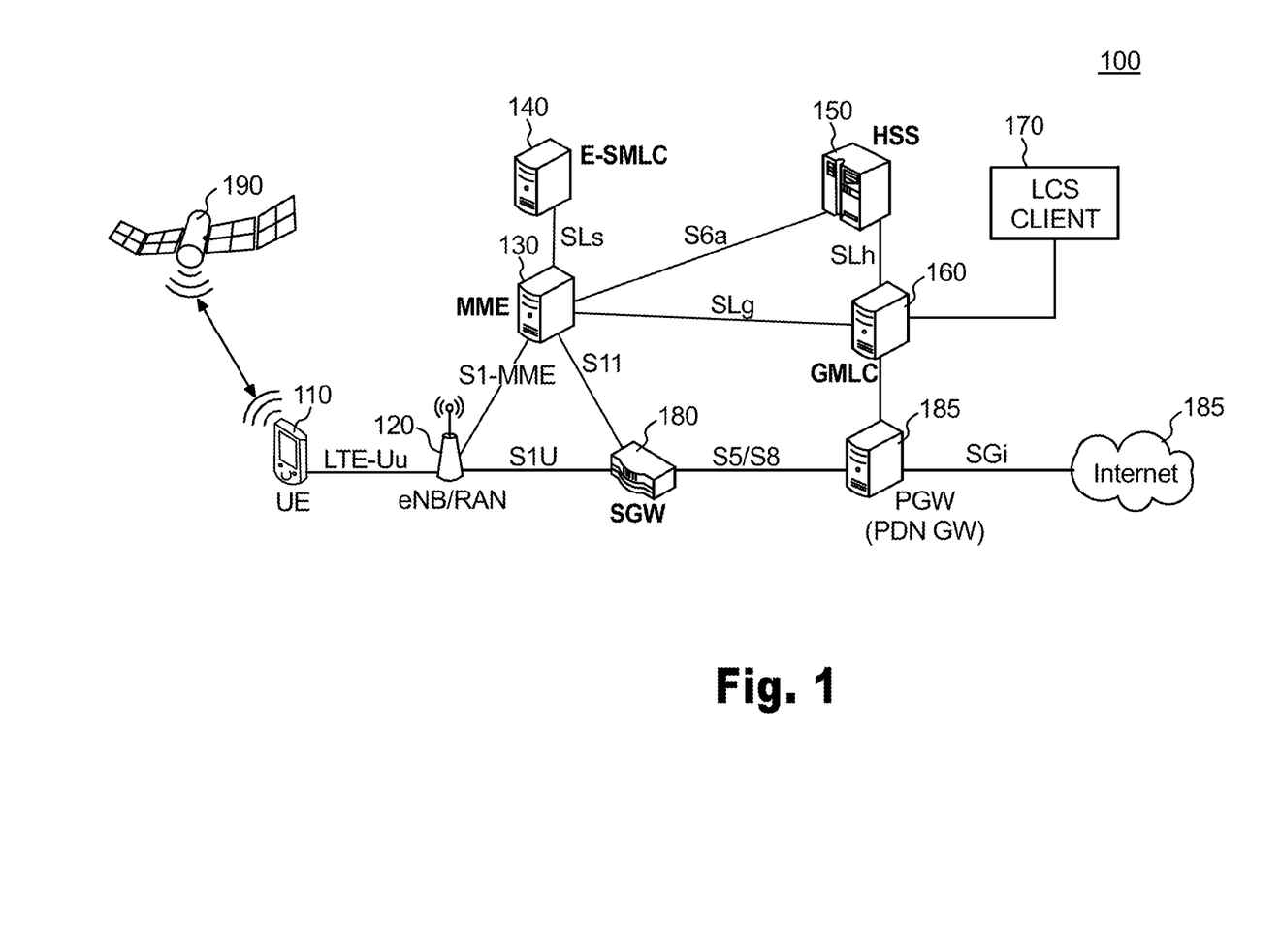
FIG. 1 illustrates an example communication network.

For purposes of explanation and illustration, and not limitation, component network nodes that support location services for a communication network 100 (e.g., a 3GPP network) are shown in FIG. 1. Communication network 100 is a geographically distributed collection of nodes interconnected by communication links and segments for transporting data between end nodes, such as User Equipment (UE) or other devices.

As shown, User Equipment (UE) 110 communicates with an Evolved Node B (eNB) 120 in a radio access network (RAN) to obtain communication services. The RAN may include other network entities not shown in FIG. 1 for simplicity and may also be referred to as an Evolved Universal Terrestrial Radio Access Network (E-UTRAN). eNB 120 is also referred to as a Node B, a base station, an access point, etc. UE 110 is also referred to as a mobile station, a terminal, an access terminal, a subscriber unit, a station, etc. and includes, for example, mobile devices, cellular phones, laptops, wireless devices, wireless modems, wireless routers, and the like.

With respect to location information, UE 110 receives and measures signals from one or more satellites 190 and obtains pseudo-range measurements for the satellites. Satellite 190 is, for example, a Global Navigation Satellite System (GNSS) satellite, which uses the United States Global Positioning System (GPS), the European Galileo system, the Russian GLONASS system, or some other GNSS. UE 110 can also measure signals from eNBs and obtain timing measurements (e.g., for time of arrival (TOA) or observed time difference of arrival (OTDOA)), signal strength measurements, and/or signal quality measurements for the eNBs. The pseudo-range measurements, timing measurements, signal strength measurements, and/or signal quality measurements are used to derive a location estimate (e.g., a position estimate, a position fix, etc.) for UE 110.

The eNB 120 also communicates with a Mobility Management Entity (MME) node 130, which performs various control functions such as mobility management, gateway selection, authentication, bearer management, etc. MME node 130 communicates with an evolved Serving Mobile Location Center (E-SMLC) 140 node, a Home Subscriber Server (HSS) node 150, and a Gateway Mobile Location Center (GMLC) node 160. Notably, the E-SMLC node 140 supports UE-based, UE-assisted, network-based and/or network-assisted positioning methods. The E-SMLC node 140 also communicates with GMLC node 160 to support location services.

The GMLC node 160 performs various functions to support location services, interface with external LCS clients (e.g., an LCS client 170), and provide services such as subscriber privacy, authorization, authentication, billing, etc. In certain configurations, the GMLC node 160 includes a Home GMLC node (H-GMLC), a Visited GMLC node (V-GMLC), and/or a Requesting GMLC node (R-GMLC) (not shown). HSS node 150 stores subscription information for users, performs authentication and authorization of users, and provides information about user location and routing information when requested.

A Serving Gateway (S-GW) node 180 performs various functions related to IP data transfer for UE(s) such as data routing and forwarding, mobility anchoring, etc. A Packet Data Network (PDN) Gateway node 185 performs various functions such as maintenance of data connectivity for UEs, IP address allocation, etc. and facilitates connection to a data network 185 (i.e., the Internet).

FIG. 1 also shows various network interfaces between various network nodes or entities including, but not limited to: an SLs network interface between MME 130 and E-SMLC 140; an SLg network interface between MME 130 and GMLC 160; and an SLh network interface between HSS 150 and GMLC 160.

The SLs network interface is used to convey location requests from the MME 130 node to the E-SMLC node 140 and to convey corresponding location reports back from the E-SMLC node 140 to the MME node 130. The SLs interface is also used for tunneling core network measurement requests from the E-SMLC node 140 to the RAN/eNB 120, using RAN specified protocols transparent to the MME (described in 3GPP TS 36.305). The SLh network interface is the Diameter based interface between the HSS and the GMLC as described in 3GPP TS 29.173. For example the SLh network interface enables HSS node 150 to provide the MME address, the VPLMN identity, and/or other information to GMLC node 160. The SLg interface enables an H-GMLC to provide the MME address to a V-GMLC when the location of a particular UE is being requested by the H-GMLC.

Notably, while FIG. 1 shows a specific design of an LTE network architecture, (i.e., with E-SMLC 140 being connected to MME 130, with E-SMLC 140 in communication with eNB 120, etc.)). However, other network architectures may also be used to support location services and positioning and may include network entities that may be coupled in other manners. These various network architectures may also include network entities not shown in FIG. 1.

Figure 2:
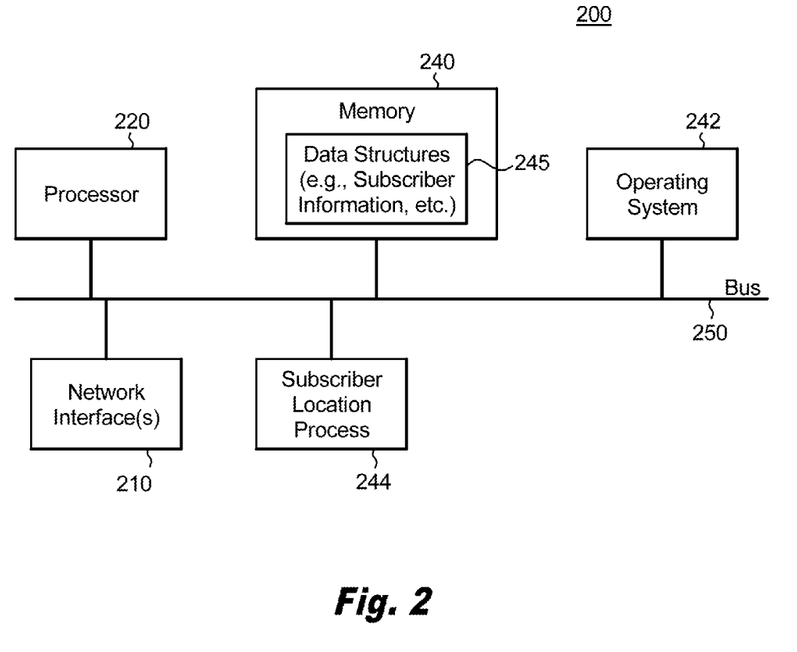
FIG. 2 illustrates an example network device/node.

FIG. 2 is a schematic block diagram of an example node/device 200 that may be used with one or more embodiments described herein, e.g., as a one of the gateway nodes/devices shown in FIG. 1 or as a subscriber location device/node (discussed with respect to FIG. 4, below). The device 200 comprises one or more network interfaces 210, at least one processor 220, and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc.

The memory 240 comprises a plurality of storage locations that are addressable by the processor 220 and the network interfaces 210 for storing software programs and data structures (e.g., subscriber information, etc.) associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as addresses, routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services include subscriber location process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the subscriber location 244, which may contain computer executable instructions executed by the processor 220 (or independent processor of network interfaces 210) to perform functions relating to the techniques described herein.

Figure 3:
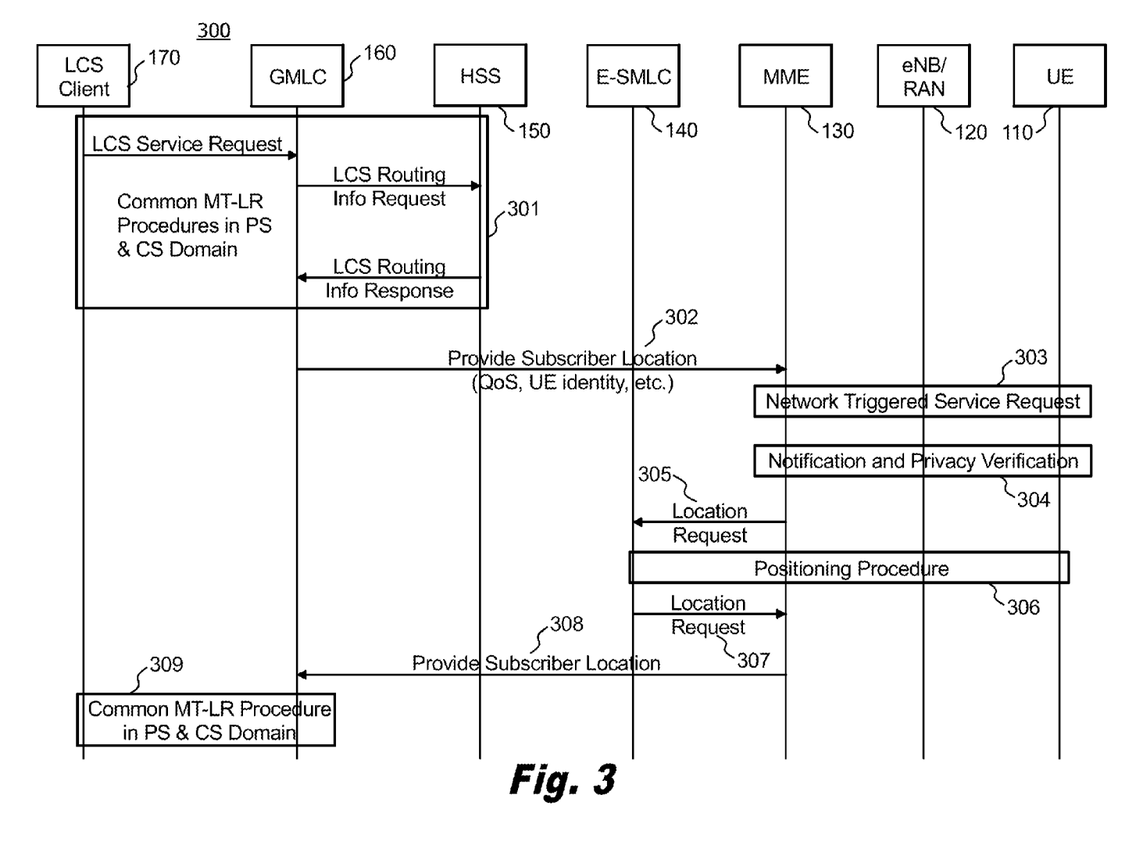
FIG. 3 illustrates an example signaling diagram, showing various call flows or messages that support location services and positioning.

Referring now to FIG. 3, a signaling diagram 300 illustrates various call flows or messages that support location services and positioning. Each call flow may include a sequence of messages exchanged between various network node entities. As discussed above, different network architectures may support communication between different network entities. However, for clarity, the description below is for the network architecture shown in FIG. 1, with E-SMLC 140 being able to communicate directly with MME 140 but not eNB 120 or GMLC 160.

FIG. 3 shows a signaling diagram 300 for a Mobile Terminated Location Request (MT-LR) procedure (e.g., in packet-switched (PS) and circuit-switched (CS) domain) for the first network architecture shown in FIG. 1, as described in 3GPP TS 23.271, incorporated by reference herein in its entirety. The location request procedure, as illustrated in signaling diagram 300, is in response to an LCS client request (step 301) from LCS client 170. LCS client 170 sends a service request to GMLC node 160, which then performs a common MT-LR procedure described in 3GPP TS 23.271, which (briefly) includes resolving routing information between the GMLC node 160 and the HSS node 150. Once resolved, GMLC node 160 sends a Provide Subscriber Location (PSL) message, at step 302 to MME node 130 (which MME node was indicated by HSS 150 during step 301). The PSL message includes, for example, the type of location information being requested (e.g., current location, velocity, etc.), an International Mobile Subscriber Identity (IMSI) of the UE subscriber, LCS quality-of-service (QoS) information (e.g., accuracy, response time, etc.), privacy related action for the UE subscriber, etc.

In response, MME node 130, eNB/RAN 120 and UE 110 perform network triggered service requests (step 303), notification and privacy verifications (step 304), etc. For example, if UE 110 is in an idle state, then MME node 130 may perform a network triggered service request procedure in order to establish a signaling connection for UE 110 and to assign a specific eNB (e.g., eNB 120) to UE 110 (step 303). If the PSL message indicates that UE 110 should either be notified or be notified with privacy verification (step 304), then MME 130 may notify UE 110 of the location request and may verify its privacy preference. Step 304 may also include sending a Location Notification Invoke message to UE 110. UE 110 may wait for the user to grant or withhold permission and may then return a Location Notification Return Result message to MME 130.

In step 305, MME node 130 selects E-SMLC node 140 and sends a Location Request message to E-SMLC 140. The Location Request message includes the type of location information being requested, the requested LCS QoS, the identity of the serving eNB, the UE positioning capabilities, etc. If the requested location information and location accuracy within the LCS QoS can be satisfied based on parameters (e.g., eNB identity) received from MME node 130, then E-SMLC node 140 send a Location Response message immediately (not shown in FIG. 3). Otherwise, E-SMLC 140 may determine one or more positioning methods to use and prompt a positioning procedure for the positioning method(s) (step 306). E-SMLC node 140 may receive measurements from the positioning procedure and may determine a location estimate for UE 110 based on the measurements. If E-SMLC node 140 fails to receive measurements, then it may use the current eNB identity to obtain an approximate location estimate for UE 110. E-SMLC node 140 also receives a location estimate from UE 110, which may be obtained with a UE-based positioning method, and may verify consistency of this location estimate with the current eNB location. If the location estimate does not satisfy the requested accuracy and sufficient response time still remains, then E-SMLC node 140 may instigate another positioning procedure using the same or different positioning method. After completing the positioning procedure in step 306, E-SMLC node 140 sends a Location Response message to MME 130 (step 307). The Location Response message includes a location estimate for UE 110 obtained from the positioning procedure, an indication of whether the location estimate satisfies the requested accuracy, the positioning method used to obtain the location estimate, a failure cause if a location estimate could not be obtained, etc.

At step 308, MME node 130 returns the requested location information to GMLC node 160. MME 130 may return an error response to GMLC node 160 if, for example, permission is not granted by the user or is not received from UE 110 for the privacy verification in step 304 or a valid location estimate is not obtained from E-SMLC node 140 in step 307. MME node 130 may also return the last known location of UE 110 if allowed and if a valid location estimate is not obtained. MME node 130 may record charging information. The common MT-LR procedure in PS and CS domain is then performed to return the location information to LCS client 170 (step 309).

As noted above, although obtaining location via conventional LCS client requests/responses have generally been considered satisfactory for their intended purpose, there is still a need in the art for improved location services. Accordingly, the subject disclosure provides improved location services techniques to obtain location information for UE(s), maintain the location information for the UE(s) in a location services database and trigger location information lookup for UE(s) based on specific events (e.g., network changes, handovers, time-based, geo-fencing, etc.). Further, these improved location services techniques provide historical and current geographical location information for UE, make on-demand location requests (when location information is not readily available in the location services database), and provide information location data to third party applications.

Figure 4:
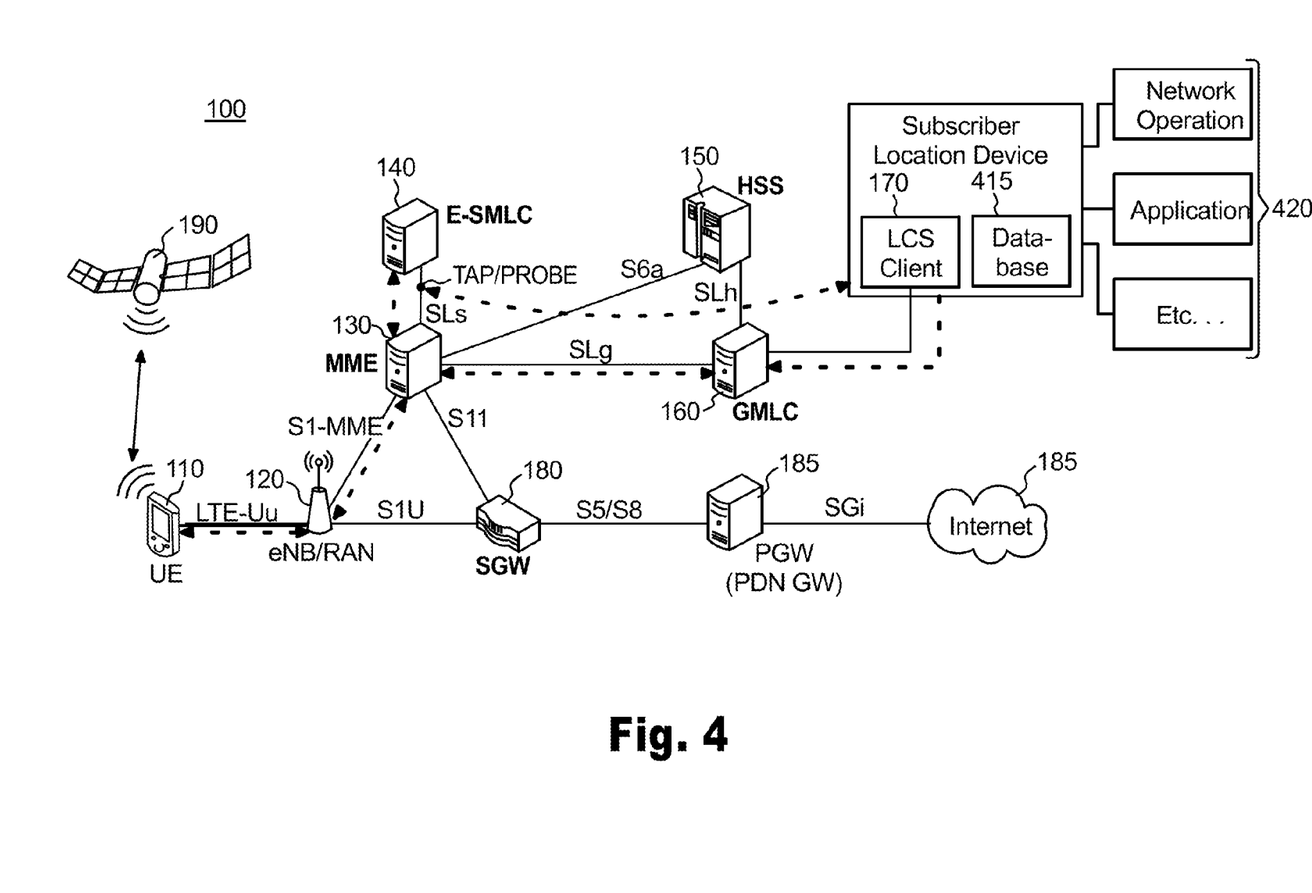
FIG. 4 illustrates the example communication network of FIG. 1, further showing a subscriber location device.

Referring now to FIG. 4, the communication network shown in FIG. 1 is provided along with a subscriber location device 410. As discussed above, subscriber location device 410 can comprise the components of device/node 200, shown in FIG. 2. Additionally, subscriber location device 410 can include any number of additional remote or resident devices/nodes/etc. For example, as shown, subscriber location device 410 incorporates the LCS client 170 as well as a subscriber location database 415.

Subscriber location device 415 extracts key location information (e.g., geographical information) for UE(s) 110 and store the location information in the subscriber location database 415. The subscriber location database 415 is queried by a variety of applications 420 (e.g., network operations, other applications, etc.). The subscriber location database 415 can include, for example, an application programming interface (API).

Operatively, location information for UE(s) 110 is obtained by monitoring, via the subscriber location device, the diameter SLs network interface between E-SMLC node 140 and MME node 130. Such location information includes, for example, precise geographical coordinates such as altitude, horizontal speed and vertical velocity of UE 110. Subscriber location device 410 location monitors location information via a tap/probe on the SLs network interface and stores the location information in the subscriber location database 415. Typically, the location information is, for example, stored and indexed according to an associated UE.

An application 420 queries subscriber location device 410 for location information for UE (e.g., UE 110). If the location information associated with UE 110 is not up-to-date or otherwise unavailable, subscriber location device 410 optionally launches or triggers the LCS Client 170 to request location information to/from the GMLC node 160.

Notably, in certain embodiments, the application 420 and/or the subscriber location device 410 can also establish trigger criteria, which causes a request for updated location information for the UE. For example, trigger criteria can include out-of-date subscriber location information, a geographical position of the UE (e.g., geo-fencing, etc.), a time, a detected handover of the UE in a communication network, a geographical location of the UE relative to an emergency situation, a retail facility, etc. In addition, the subscriber location database 415 can work in conjunction with the application 420 (e.g., via the application programming interface (API)) to support online near-real-time complex event processing (e.g., the application can configure certain triggers based on subscriber events). Additionally, application 420 can include a complex event processing engine that triggers dynamic queries to the network to fetch (e.g., update) subscriber data.

The GMLC node receives the request and operates to obtain location information (e.g., exchanging messages between MME node 130, eNB/RAN 120, E-SMLC node 140, UE 110, etc.). Subscriber location device 410 continues to monitor the SLs network interface for updated location information for UE 110 and receives the location information (e.g., an altitude, a horizontal speed and a vertical velocity, etc.). The subscriber location device 410 further associates the received location information with the corresponding UE to yield associated location information, stores the updated location information (e.g., indexed according to the associated UE), and sends the updated location information to the application.

With respect to triggers, applications 420 and/or subscriber location device 410 establish criteria to trigger requests for location information for UEs. For example, as previously discussed, if the location information does not exist and/or if the location information is out-of-date, a trigger is executed to obtain location information. In other embodiments, the triggers can be based on UE position (e.g., geo-fencing), a time (e.g., a time of day), a detected handover for the UE in the communication network (e.g., moving from coverage areas and/or moving from 3GPP to non-3GPP coverage, etc.), or even advertisement based location triggering (e.g., vicinity to a shopping center, etc.).

Figure 5:
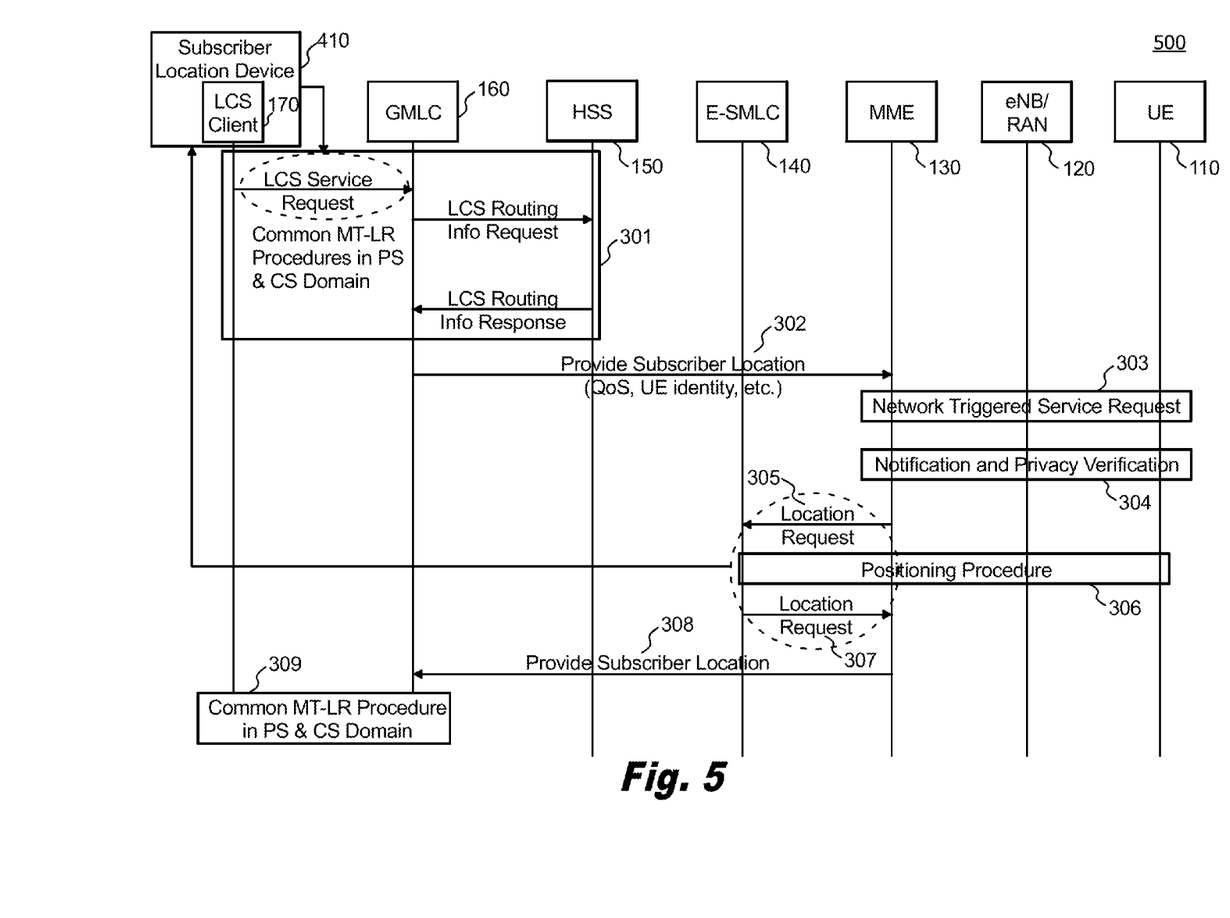
FIG. 5 illustrates an example signaling diagram, showing various call flows or messages that support location services and positioning using the subscribe location device.

FIG. 5, similar to signaling diagram 300 (ref. FIG. 3 above), provides a signaling diagram 500 for the Mobile Terminated Location Request (MT-LR) procedure. Different than signaling diagram 300, the signaling diagram 500 further illustrates the subscriber location device 410 and highlights the improved location services techniques discussed above.

In particular, the subscriber location device 410 triggers, via the LCS client 170, a location request (i.e., LCS service request) at step 301. As discussed above, subscriber location device 410 also monitors the SLs network interface between E-SMLC node 140 and MME node 130 for location information. For example, as shown in signaling diagram 500, the subscriber location device 410 monitors the location requests (step 305, the positioning procedure (step 306) and the location response (step 307). In this fashion, the subscriber location device 410 receives location information for UE 110. Further, as discussed above, the location information is subsequently stored in subscriber location database 415 and can be queried by third party applications.

Figure 6:
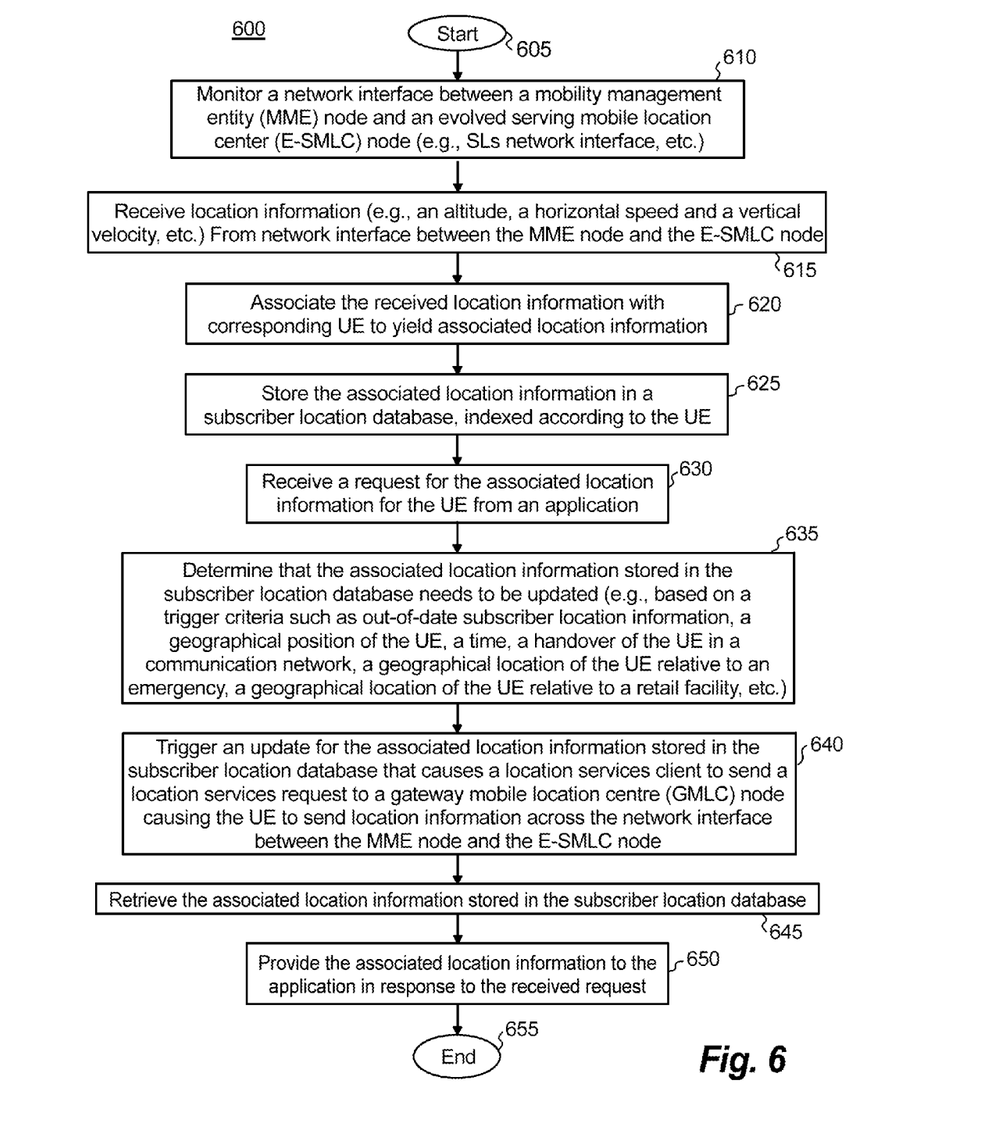
FIG. 6 illustrates an exemplary simplified procedure for location services, particularly from the perspective of the subscriber location device.

FIG. 6 illustrates an example simplified procedure 600 for improved location services (e.g., subscriber location process/services 244), particularly, from the perspective of a subscriber location device (e.g., subscriber location device 410), in accordance with one or more embodiments described herein.

Procedure 600 starts at step 605 and continues to step 610 where, as discussed above the subscriber location device monitors a network interface between a Mobility Management Entity (MME) node and an Evolved Serving Mobile Location Center (E-SMLC) node (e.g., SLs network interface, etc.). The subscriber location device receives, in step 610, location information (e.g., an altitude, a horizontal speed and a vertical velocity, etc.) from network interface between the MME node and the E-SMLC node. At step 615, the subscriber location device associates the received location information with corresponding UE to yield associated location information and stores the associated location information in a subscriber location database (e.g., subscriber location database 415), indexed according to the UE.

In certain embodiments, the subscriber location device receive, at step 630, a request for the associated location information for the UE from an application (e.g., applications 420) and determines (at step 635) that the associated location information stored in the subscriber location database needs to be updated (e.g., based on trigger criteria such as out-of-date subscriber location information, based on a geographical position (of the UE), a time, a detected handover of the UE in a communication network, geographical location relative to an emergency situation, geographical location relative to a retail facility, etc.). Once determined, the subscriber location device triggers, at step 635, an update for the associated location information stored in the subscriber location database that causes a location services client to send a location services request to a Gateway Mobile Location Centre (GMLC) node. As discussed above, the GMLC node subsequently causes, via the MME node, the UE to send location information across the network interface between the MME node and the E-SMLC node.

At step 645, the subscriber location device retrieves the associated location information stored in the subscriber location database and at step 650, the subscriber location device provides the associated location information to the application in response to the received request. Subsequently, procedure 600 ends at step 655, or it can subsequently proceed to step 610 where the subscriber location device monitors the network interface between the MME node and the E-SMLC node, discussed above.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for improved location services using a subscriber location device. In particular, the techniques herein provide for storing and otherwise making available subscriber location information of UE for third party applications, which can be used in various types of location-based uses (e.g., geo-fencing, emergency situations, targeted retailing, etc.). Moreover, these techniques are scalable to various other types of networks and obviate restrictive permissions of service providers.

While there have been shown and described illustrative embodiments that provide for improved location services, it is to be understood that various other adaptations and modifications may be made within the spirit and scope of the embodiments herein. For example, the embodiments have been shown and described herein with relation to a using a subscriber location device that monitors and stores subscriber location information for LTE/3GPP networks. However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for determining location information for User Equipment (UE) in a communication network, the method comprising:
monitoring, via a subscriber location node, a network interface between a Mobility Management Entity node and an Evolved Serving Mobile Location Center (E-SMLC) node;
receiving, via the subscriber location node, location information from network interface between the MME node and the E-SMLC node;
associating, via the subscriber location node, the received location information with corresponding UE to yield associated location information; and
storing, via the subscriber location node, the associated location information in a subscriber location database, indexed according to the UE.

2. The method of claim 1, further comprising:
receiving, via the subscriber location node, a request for the associated location information for the UE from an application;
retrieving, via the subscriber location node, the associated location information stored in the subscriber location database; and
providing, via the subscriber location node, the associated location information to the application in response to the received request.

3. The method of claim 2, further comprising:
determining, via the subscriber location node, the associated location information stored in the subscriber location database needs to be updated; and
triggering, via the subscriber location node, an update for the associated location information stored in the subscriber location database that causes a location services client to send a location services request to a Gateway Mobile Location Centre (GMLC) node, wherein the GMLC node causes, via the MME node, the UE to send location information across the network interface between the MME node and the E-SMLC node.

4. The method of claim 3, wherein determining, via the subscriber location node, the associated location information stored in the subscriber location database needs to be updated further comprises:
determining, via the subscriber location node, trigger criteria to update the associated location information stored in the subscriber location database, wherein the trigger criteria includes at least one of a geographical position of the UE, a time, and a detected handover of the UE in the communication network.

5. The method of claim 4, wherein the trigger criteria further includes at least one of a geographical position relative of the UE to an emergency situation and a geographical position of the UE relative to retail facility.

6. The method of claim 1, wherein the location information includes at least one of an altitude, a horizontal speed and a vertical velocity.

7. The method of claim 1, wherein the network interface between the MME node and the Evolved Serving Mobile Location Center (E-SMC) node is an SLs network interface.

8. A subscriber location device for determining location information for User Equipment (UE), comprising:
one or more network interfaces adapted to communicate in a communication network;
a processor adapted to execute one or more processes; and
a memory configured to store a process executable by the processor, the process when executed operable to:
monitor a network interface between a Mobility Management Entity node and an Evolved Serving Mobile Location Center (E-SMLC) node;
receive location information from network interface between the MME node and the E-SMLC node;
associate the received location information with corresponding UE to yield associated location information; and
store the associated location information in a subscriber location database, indexed according to the UE.

9. The device of claim 8, wherein the process, when executed, is further operable to:
receive a request for the associated location information for the UE from an application;

retrieve the associated location information stored in the subscriber location database; and provide the associated location information to the application in response to the received request.

10. The device of claim 9, wherein the process, when executed, is further operable to:

determine the associated location information stored in the subscriber location database needs to be updated; and trigger an update for the associated location information stored in the subscriber location database that causes a location services client to send a location services request to a Gateway Mobile Location Centre (GMLC) node, wherein the GMLC node causes, via the MME node, the UE to send location information across the network interface between the MME node and the E-SMLC node.

11. The device of claim 10, wherein the process, when executed to determine the associated location information stored in the subscriber location database needs to be updated, is further operable to:

determine trigger criteria to update the associated location information stored in the subscriber location database, wherein the trigger criteria includes at least one of a geographical position of the UE, a time, and a detected handover of the UE in the communication network.

12. The device of claim 11, wherein the trigger criteria further includes at least one of a geographical position of the UE relative to an emergency situation and a geographical position of the UE relative to retail facility.

13. The device of claim 9, wherein the location information includes at least one of an altitude, a horizontal speed and a vertical velocity.

14. The device of claim 9, wherein the network interface between the MME node and the Evolved Serving Mobile Location Center (E-SMC) node is an SLs network interface.

15. A tangible, non-transitory, computer-readable media having software encoded thereon, the software, when executed by a processor, operable to:

monitor a network interface between a Mobility Management Entity node and an Evolved Serving Mobile Location Center (E-SMLC) node;

receive location information from network interface between the MME node and the E-SMLC node;

associate the received location information with corresponding UE to yield associated location information; and store the associated location information in a subscriber location database, indexed according to the UE.

16. The tangible, non-transitory, computer-readable media of claim 15, wherein the software, when executed by the processor, operable to further:

receive a request for the associated location information for the UE from an application;

retrieve the associated location information stored in the subscriber location database; and provide the associated location information to the application in response to the received request.

17. The tangible, non-transitory, computer-readable media of claim 16, wherein the software, when executed by the processor, operable to further:

determine the associated location information stored in the subscriber location database needs to be updated; and trigger an update for the associated location information stored in the subscriber location database that causes a location services client to send a location services request to a Gateway Mobile Location Centre (GMLC) node, wherein the GMLC node causes, via the MME node, the UE to send location information across the network interface between the MME node and the E-SMLC node.

* * * * *